Nov. 10, 1970  W. BLUME  3,539,855
ELECTRODYNAMIC MACHINE

Filed March 18, 1968  3 Sheets-Sheet 1

INVENTOR
Willi BLUME
By

Michael S. Striker his ATTORNEY

Nov. 10, 1970  W. BLUME  3,539,855

ELECTRODYNAMIC MACHINE

Filed March 18, 1968  3 Sheets-Sheet 2

INVENTOR
Willi BLUME
By his ATTORNEY

Nov. 10, 1970  W. BLUME  3,539,855

ELECTRODYNAMIC MACHINE

Filed March 18, 1968

INVENTOR
Willi BLUME
By his ATTORNEY

United States Patent Office 3,539,855
Patented Nov. 10, 1970

1

3,539,855
ELECTRODYNAMIC MACHINE
Willi Blume, Buhlertal, Germany, assignor to Robert
Bosch G.m.b.H., Stuttgart, Germany
Filed Mar. 18, 1968, Ser. No. 714,130
Claims priority, application Germany, Mar. 18, 1967,
B 70,245
Int. Cl. H02k 13/00
U.S. Cl. 310—239                                16 Claims

ABSTRACT OF THE DISCLOSURE

An electrodynamic machine comprises a rotatable armature having an axis of rotation and including a shaft which extends along this axis. A commutator is carried by the shaft. A supporting plate is mounted adjacent to the commutator in a plane normal to the axis of rotation of the armature and carries a plurality of commutator brushes. A plurality of electric terminals are adapted to be connected to an external electric circuit and are conductively associated with the brushes. The terminals are mounted directly on the supporting plate so as to be carried by the same.

BACKGROUND OF THE INVENTION

The present invention relates to electrodynamic machines in general, and more particularly to small machines. Still more specifically, the present invention relates to electrodynamic machines of the type comprising a rotatable armature having a commutator carried by the armature shaft and a supporting plate for the commutator brushes mounted proximal to the commutator in a plane normal to the axis of rotation of the armature.

In machines of this general type here under discussion it is known to provide plug-in type terminals by means of which the machine can be connected with external electric circuit. Conventionally these terminals are connected with metallic guide sleeves for the commutator brushes, which guide sleeves surround the commutator brushes and are embedded in a supporting member of insulating material. This construction, while fully satisfactory as to its performance is relatively expensive and complicated and is therefore not well suited for inexpensive machines, particularly for machines of small dimensions.

Another construction also known from the prior art mounts a supporting body for the commutator brushes consisting of synthetic plastic material on the field frame of the machine by means of screws. The terminals are carried by this supporting body. Again, however, this construction is relatively complicated and therefore expensive. Furthermore, it is not universally useable in that it is suitable only if the supporting body is mounted in this precise manner, on the field frame.

It is therefore a general object of the present invention to overcome the shortcomings of the aforementioned prior-art constructions.

A more particular object of the present invention is to provide for simple and inexpensive mounting of the plug-in type terminals.

A further object of the invention is to provide a construction which is suitable universally for all electro-

2 dynamic machines utilizing a supporting body or plate for the commutator brushes.

SUMMARY OF THE INVENTION

In accordance with one feature of my invention I provide, in an electrodynamic machine, of the type here under discussion, a rotatable armature which has an axis of rotation and which includes a shaft extending along this axis. A commutator is carried by the shaft. A supporting plate for the commutator brushes is mounted proximal to the commutator and extends in a plane normal to the axis of rotation. A plurality of commutator brushes are carried by the supporting plate. A plurality of electric terminals are adapted to be connected to an external electric circuit and are conductively connected with the brushes. Mounting means mounts these terminals directly on the supporting plate so that the terminals are carried by the same.

Thus, mounting of the terminals is effected in a simple and reliable manner without requiring any additional auxiliary members, and regardless of how the supporting plate itself is secured in the machine. The supporting plate may advantageously but not necessarily, be secured to a portion of the field frame of the machine by engagement of cooperating centering and mounting portions provided on the field frame and the supporting plate and by upsetting of such mounting portions to prevent disengagement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED
EMBODIMENT

Figure 1:
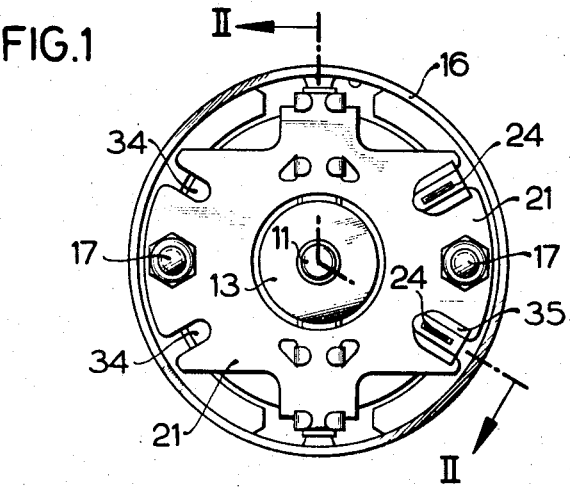
FIG. 1 illustrates a first embodiment of the invention in an electrodynamic machine, with the field frame removed and in an end view.
Figure 2:
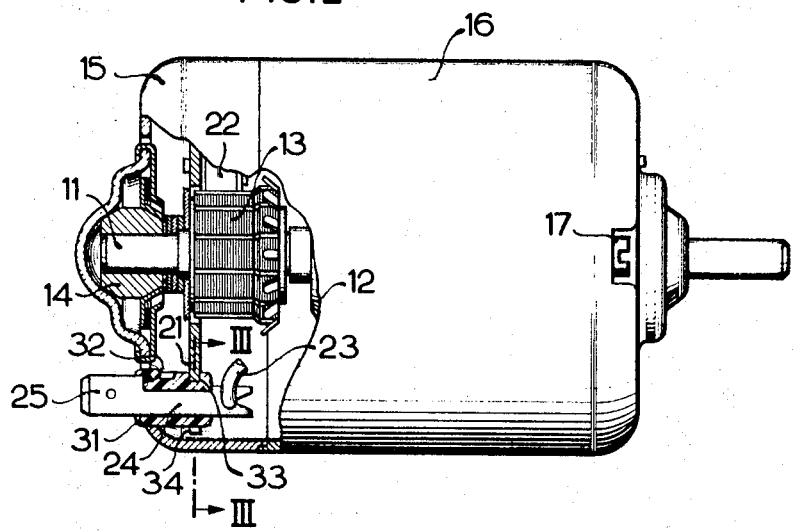
FIG. 2 is a side elevational view of the embodiment of FIG. 1, partially sectioned on the line II—II of FIG. 1.
Figure 3:
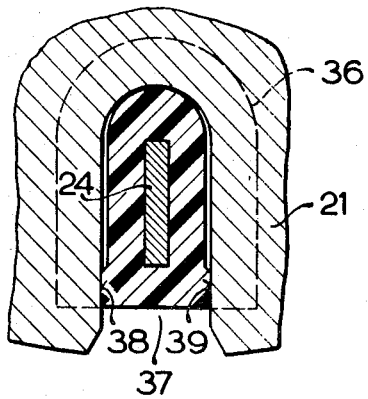
FIG. 3 is a fragmentary section taken on the line III—III of FIG. 2.

Discussing now the drawing in detail, and firstly the embodiment shown in FIGS. 1–3, it will be seen that there is illustrated a direct current motor with permanent-magnet excitation. This motor comprises a shaft 11 on which there is secured an armature 12 and a commutator 13. FIG. 2 shows that the shaft 11 is rotatably mounted in two bushings which are assumed to be of sintered metallic material and of which only the one identified with reference numeral 14 is visible. The bushing 14 is mounted in a support frame 15. The other non-illustrated bushing is located within a substantially cup-shaped housing 16. The support frame 15 and the housing 16 are securely connected to one another by means of known tension-exerting devices 17.

A supporting plate 21 for the commutator brushes 22 of the commutator 13 is secured to the anchoring devices 17. This is clearly visible in FIGS. 1 and 2, and particularly in FIG. 2 it is also shown that the commutator brushes 22 are each connected with metallic flat plug-in terminals 24 by means of flexible copper braids also known as "pigtails." The terminals 24 comprise end portions 25 which extend outwardly beyond the support frame 15, and are adapted to be plugged into complementarily configurated receptacles of the external electric circuit. In the illustrated embodiment of FIGS. 1–3, the terminals 24 are surrounded over a portion of their length, with a body of synthetic plastic material, identified with reference numeral 31. To prevent sliding of the terminals 24 with reference to the body 31 the terminals are provided with shoulders 32 and 33 (compare FIG. 2).

As most clearly shown in FIG. 1, the supporting plate 21 is provided in this embodiment with four slots 34 which extend radially inwardly from the peripheral edge face of the plate 21, and each of the terminals 24 with its associated plastic body 31 is received in one of these slots 34 by being slipped or slid into the slot radially inwardly. As is visible in FIGS. 2 and 3, each of the bodies 31 is provided with two projections 36 at its outer surface, these projections 36 being axially spaced so as to receive the inner edge portion bounding the respective slots 34 between themselves and thereby to secure the respective body 31 and the associated terminal 24 against sliding movement with respect to the plate 21. Projections 38 and 39 (compare FIG. 3) are provided on the body 31 intermediate the projections 36 thereof and are so configurated that, when the body 31 is received in the respective slot 34 it will tightly and frictionally engage the inner peripheral edge of the plate 21 bounding the respective slot 34 so as to prevent undesired sliding of the respective body 31 radially outwardly of the associated slot 34. FIG. 3 shows that in the illustrated embodiment these projections 38, 39 are located on that side of the body 31 which faces the open end 37 of the associated slot 34.

Coming now to the embodiments illustrated in FIGS. 4–10 it will be seen that this also shows a direct-current motor with permanent-magnetic excitation. The magnet bodies of this motor are not illustrated in the drawing but are assumed to be secured to an annularly configurated field frame 41 (compare FIG. 4). While both in FIGS. 1–3 and in FIGS. 4–10 I have illustrated a direct-current motor with permanent-magnetic excitation I wish it to be understood that my invention is by no means limited to motors of this type and can be equally well used with any electrodynamic machines having a supporting plate for the commutator brushes.

Figure 4:
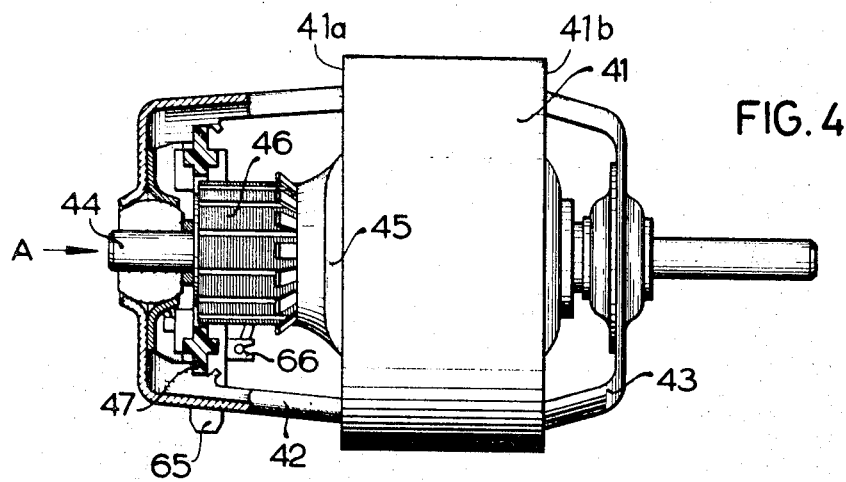
FIG. 4 illustrates a further embodiment of the invention in a view somewhat similar to that of FIG. 2, but incorporated in a machine of different construction.
Figure 6:
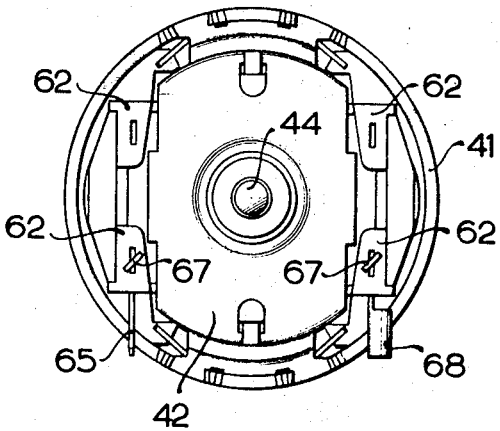
FIG. 6 is a view of FIG. 4 as seen in the direction of the arrows A associated with that figure.
Figure 5:
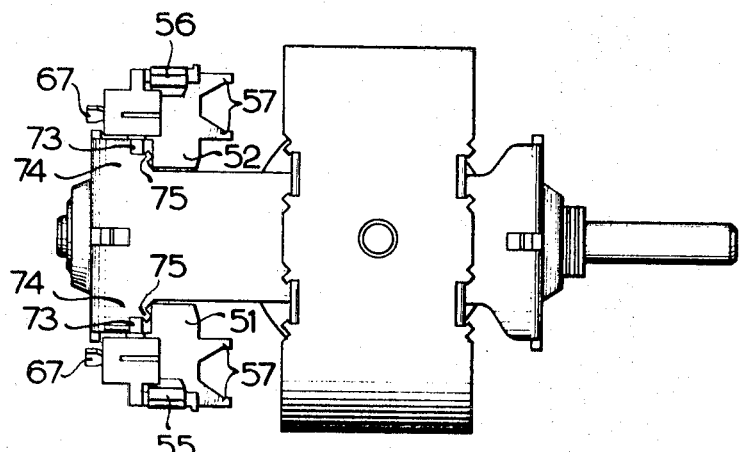
FIG. 5 is a top-plan view of FIG. 4.

FIG. 4 shows that in the illustrated embodiment the axial end faces 41a, 41b of the field frame 41 have secured thereto two supporting frame sections 42 and 43 each of which consists of a U-shaped strip of metallic material. The sections 42 and 43 carry respective bushings (not identified with reference numerals) in which the shaft 44 of the motor is rotatably mounted. The armature 45 and the commutator 46 are mounted on the shaft 44 and the brushes associated with the commutator 46, but which have been omitted in the drawing for the sake of clarity, are carried on a supporting plate 47 which is secured to the arms of the supporting frame section 42.

Figure 7:
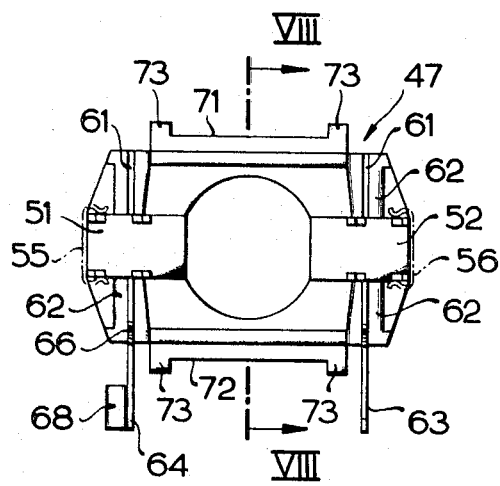
FIG. 7 is an end view of a supporting plate used in the embodiment of FIG. 4.
Figure 8:
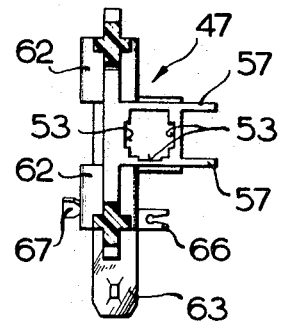
FIG. 8 is a section taken on the line VIII—VIII of FIG. 7.

The configuration of this supporting plate is most clearly shown in FIG. 7. In this embodiment it is assumed that the supporting plate 47 consists of synthetic plastic material and it will be also understood that it may be advantageously produced by injection molding. As FIG. 7 shows, the supporting plate 47 is provided with integral guide sleeves 51 and 52 in which the commutator brushes are secured for movement in predetermined direction, that is in the direction of their respective axes. These guide sleeves are provided in their internal guide faces (compare also FIG. 8) with longitudinally extending grooves 53 which serve to dissipate heat developing at the (non-illustrated) commutator brushes.

Figure 9:
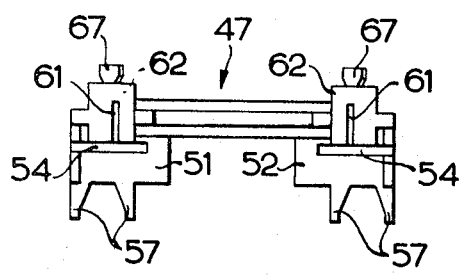
FIG. 9 is a top-plan view of FIG. 7.

One longitudinal wall portion of each of the guide sleeves 31 and 32 is provided with slots 54, as shown in FIG. 9 and the pigtails for the commutator brushes extend through these slots 54. The guide sleeves have first open ends facing towards the commutator and second open ends facing away from the commutator. Those sides of the guide sleeves which face away from the commutator are closed, subsequent to insertion of the (non-illustrated) commutator brushes and commutator-brush springs by means of spring-cups 55 and 56, respectively. These are shown in broken lines in FIG. 7. Projections 57 which are also integral with the guide sleeves 51 and 52 serve for fixedly mounting auxiliary components such as interference suppressors or the like.

As FIGS. 7 and 9 show most clearly, four slots 61 are provided in the supporting plate 47 which extend normal to the axis of the commutator brushes, that is normal to the direction of movement of the latter within the guide sleeves 51 and 52, and which extend from these guide sleeves to the peripheral edge face of the supporting plate 47. It will be noticed that these slots 61 are open not only at the peripheral edge face, but also at one axial face of the supporting plate 47 and it is preferred and illustrated in FIGS. 7 and 9 that the slots 61 be provided in portions 62 of the supporting plate 47 where the thickness of the supporting plate is locally greater than the remainder of the supporting plate. In fact, in these portions 62 the thickness is increased on both axial sides of the supporting plate 47.

Figure 10:
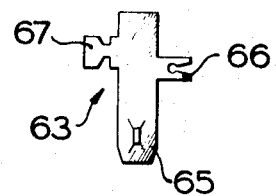
FIG. 10 is a plan view of one of the terminals employed in the embodiment of FIG. 4.

In the embodiments of FIGS. 4–10 the terminals are identified with reference numerals 63 and 64 and are assumed to be stampings of metallic material. These stampings are illustrated in FIG. 10 and it will be seen that in addition to the contact portion 65, which is adapted to be received in a correspondingly configurated receptacle, each of the terminals further comprises a connecting portion 66 and a securing portion 67. FIG. 10 illustrates the terminal 63 and the terminal 64 is substantially similar to this, but in place of the flat plug-type portion 65, the terminal 64 is provided with a receptacle-shaped or sleeve-shaped portion 68 as shown in FIG. 7. This latter, of course, then cooperates with a complementary portion provided in the exterior electric circuit and corresponding to the portion 65 of the terminal 63. The connecting portions 66 serve for connection, for instance by means of soldering, to the pigtails which are also connected with the commutator brushes.

The terminals 63 and 64 are received in the slots 61 in such a manner that the connecting portions 66 extend beyond the one axial face of the supporting plate 47 towards which the slots 61 are open. The securing portions 67 extend when the terminals are thus received in the slots, through apertures extending from the interior of the slots to the other axial face of the supporting plate 47. These apertures are not specifically illustrated in the drawing but their positioning is believed to be clear. The projecting part of the securing portions 67 is slightly twisted in such a manner that undesired withdrawal of the respective terminals 63 and 64 is made impossible. Thus, these terminals are securely and reliably mounted on the supporting plate 47. It will be noted that the supporting plate is provided with four slots 61 whereas only two are actually being utilized. The two remaining slots may be used for connecting additional components to the supporting plate, for instance interference suppressing devices or the like.

To effect reliable securing of the supporting plate 47 to the supporting frame section 42, the supporting plate 47 is provided at its outer edges 71 and 72 with four projecting lugs 73 which serve for centering and securing it to the supporting frame section 42. The latter in turn is provided with shoulder-like projections 74 (compare FIG. 5) which extend between the lugs 73 of the plate 47 and which also engage the edges 71 and 72 of the plate. The height of the projections 74 is somewhat greater than the thickness of the plate 47 and the free corner 75 of each projection 74, which extends beyond the plate 47, is upset so that the plate is thus securely connected to the supporting frame section 42. The terminals 65 and 68 are located at opposite sides of the supporting frame section 42 and are freely accessible from the exterior, as evident particularly in FIG. 6.

The embodiment illustrated in FIGS. 4–10 is of particularly space-saving construction because the connecting portions 66 are located rather close to the respective associated commutator brushes so that the pigtails extending between them can be short. Furthermore, by arranging the plate on the supporting frame section 42 in such a manner that the axes of the commutator brushes is at least substantially normal to the plane of symmetry intersecting the arms of the supporting frame section 42, the engaging portions of the terminals, that is the portions which are to engage with complementarily configured terminals provided on the external electric circuit, are freely accessible from the exterior without interference by the supporting frame portion.

It will be understood that each of the elements described above, or two or more together, may also find a useful application in othr types of constructions differing from the types described above.

While the invention has been illustrated and described as embodied in an electrodynamic machine, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an electrodynamic machine of the type comprising a rotatable armature having an axis of rotation and including a shaft extending along said axis, a commutator carried by said shaft, brush means operatively associated with said commutator and including a supporting plate of synthetic plastic material being mounted proximal to said commutator in a plane normal to said axis and a plurality of commutator brushes carried by said plate, and a plurality of plug-in electric terminals being conductively connected with said brushes and adapted to be connected with an external electric circuit by frictional mating with cooperating terminals in said circuit, the improvement comprising mounting means including mounting members for said terminals and interlocking mounting portions on said plate and said member for securing the latter to the former and thereby mounting said terminals on said supporting plate so that said terminals are carried by the same.

2. In a machine as defined in claim 1, wherein said mounting members comprise a plurality of members of synthetic plastic material, each of said members being secured to and carried by said supporting plate and embracing one of said terminals.

3. In a machine as defined in claim 2, wherein said terminals are elongated, and wherein said members each surround a longitudinal increment of the respective associated terminal.

4. A machine as defined in claim 2, said supporting plate having a circumferential edge face and being provided with a plurality of slot-shaped cut-outs extending inwardly from said edge face, each of said members being received and frictionally retained in one of said cut-outs whereby the associated terminal is carried by said supporting plate.

5. In a machine as defined in claim 4, wherein said cut-outs extend radially inwardly into said supporting plate from said edge face of the latter.

6. In a machine as defined in claim 1, wherein said supporting plate is provided with a plurality of slots extending inwardly from a peripheral edge face of said plate, and wherein said terminals are sheet-metal stampings each received and fixedly retained in one of said slots.

7. In a machine as defined in claim 6, wherein said terminals each have a main body portion and a locking portion constituting the respective mounting member and extending from said main body portion, and wherein said supporting plate has one axial face and said slots each include a slot section extending to and open at said axial face, said locking portion of the respective terminal extending through the associated slot section and having a free end portion located outwardly beyond said axial face and operative for preventing undesired withdrawal of said terminal.

8. In a machine as defined in claim 7, wherein said supporting plate has another axial face facing away from said one axial face, said slots each including an additional slot section extending to and open at said other axial face, and said terminals each including a connecting lug extending through the respective additional slot section and outwardly beyond said other axial face.

9. In a machine as defined in claim 8, wherein said supporting plate comprises a plurality of marginal portions having a thickness greater than the remainder of the supporting plate, and wherein said slots are each provided in said marginal portions.

10. In a machine as defined in claim 8, wherein said supporting plate further comprises a plurality of integral portions each defining a guide sleeve inwardly of said peripheral edge face receiving and guiding one of said commutator brushes for limited movement in a predetermined direction, and wherein said slots extend normal to said predetermined direction and extending from said peripheral edge face to the respective guide sleeves.

11. In a machine as defined in claim 10; further comprising a support frame comprising two mirror-symmetrically arranged sections each consisting of a substantially U-shaped strip of metallic material having two arms, and wherein said supporting plate is mounted on the arms of one of said sections with said predetermined direction extending substantially normal to a plane of symmetry intersecting said arms of said one section.

12. In a machine as defined in claim 1, further comprising a support frame; said supporting plate and said support frame comprising cooperating centering and mounting portions for centering and mounting said supporting plate on said field frame.

13. In a machine as defined in claim 1, wherein said supporting plate comprises integral holding portions adapted and operative for fixedly connecting auxiliary components to said supporting plate.

14. In a machine as defined in claim 10, wherein said guide sleeves have a first open side facing said commutator and a second open side facing away from said first open side; and further comprising a cap of elastically deformable material closing the respective second open side of each of said guide sleeves.

15. In a machine as defined in claim 10, wherein said guide sleeves each comprise internal guide surfaces engaging the respective commutator brushes, and wherein said guide surfaces are each provided with at least one elongated heat-dissipating groove.

16. In a machine as defined in claim 15, wherein each of said grooves extends in said predetermined direction.

References Cited

UNITED STATES PATENTS

| | | | |
|---|---|---|---|
| 2,663,810 | 12/1953 | Stein | 310—238 |
| 3,127,533 | 3/1964 | Gardner | 310—239 |
| 3,138,728 | 6/1964 | Videtic | 310—239 |

MILTON O. HIRSHFIELD, Primary Examiner

L. L. SMITH, Assistant Examiner